US009309772B2

(12) United States Patent
Spoonire et al.

(10) Patent No.: US 9,309,772 B2
(45) Date of Patent: Apr. 12, 2016

(54) HYBRID TURBINE BLADE INCLUDING MULTIPLE INSERT SECTIONS

(71) Applicant: General Electric Company, Schenectady, NY (US)

(72) Inventors: Ross Ashely Spoonire, Albany, NY (US); Wendy Wen-Ling Lin, Niskayuna, NY (US); Jan Christopher Schilling, Liberty Township, OH (US); Dong Jin Shim, Niskayuna, NY (US); Gregory Carl Gemeinhardt, Cincinnati, OH (US); Prakash Kashiram Jadhav, Bangalore (IN)

(73) Assignee: General Electric Company, Niskayuna, NY (US)

( * ) Notice: Subject to any disclaimer, the term of this patent is extended or adjusted under 35 U.S.C. 154(b) by 753 days.

(21) Appl. No.: 13/774,581

(22) Filed: Feb. 22, 2013

(65) Prior Publication Data

US 2014/0294594 A1    Oct. 2, 2014

(51) Int. Cl.
*F01D 5/14*          (2006.01)
*F01D 5/28*          (2006.01)
(Continued)

(52) U.S. Cl.
CPC .............. *F01D 5/282* (2013.01); *F04D 29/023* (2013.01); *F04D 29/324* (2013.01); *F01D 5/288* (2013.01); *F05D 2220/36* (2013.01); (Continued)

(58) Field of Classification Search
CPC ....... F01D 5/282; F01D 5/288; Y02T 50/672; Y02T 50/673; Y10T 156/1002; Y10T 156/10

USPC ........................... 416/229 A, 229 R, 224, 230
See application file for complete search history.

(56) References Cited

U.S. PATENT DOCUMENTS

| 4,784,575 A | 11/1988 | Nelson et al. |
| 5,129,787 A | 7/1992 | Violette et al. |
| 5,222,297 A | 6/1993 | Graff et al. |

(Continued)

FOREIGN PATENT DOCUMENTS

| CN | 1538037 A | 10/2004 |
| FR | 2962175 A1 | 1/2012 |

(Continued)

OTHER PUBLICATIONS

PCT Search Report and Written Opinion issued May 23, 2014 in connection with corresponding PCT Patent Application No. PCT/US2014/015767.

(Continued)

*Primary Examiner* — Ching Chang
(74) *Attorney, Agent, or Firm* — John P. Darling (57) ABSTRACT

A hybrid turbine blade and method of fabrication, comprising a shank portion and an airfoil portion. The airfoil portion comprising a composite outer structure having a recess formed therein and an alternating stack of at least one composite section and at least two insert sections disposed in the recess. The outer composite structure and the at least one composite section having a first density. The at least two insert sections having a second mass density, which is less than the first mass density. The composite outer structure and the alternating stack of at least one composite section and at least two insert sections together define an airfoil portion that meets all mechanical load carrying requirements of said hybrid turbine blade such that no load transfer needs to occur through said at least two insert sections.

20 Claims, 5 Drawing Sheets

(51) Int. Cl.
  *F04D 29/32* (2006.01)
  *F04D 29/02* (2006.01)

(52) U.S. Cl.
  CPC ............ *Y02T 50/672* (2013.01); *Y02T 50/673* (2013.01); *Y10T 156/10* (2015.01); *Y10T 156/1002* (2015.01)

(56) References Cited

U.S. PATENT DOCUMENTS

| | | | |
|---|---|---|---|
| 5,269,658 | A | 12/1993 | Carlson et al. |
| 6,607,358 | B2 | 8/2003 | Finn et al. |
| 6,676,080 | B2 | 1/2004 | Violette |
| 7,334,997 | B2 | 2/2008 | Karafillis |
| 8,272,841 | B2 | 9/2012 | Pentony |
| 2013/0272893 | A1 | 10/2013 | Fabre et al. |

FOREIGN PATENT DOCUMENTS

| | | |
|---|---|---|
| GB | 2249592 A | 5/1992 |
| WO | 2012041991 A1 | 4/2012 |
| WO | 2012041992 A1 | 4/2012 |

OTHER PUBLICATIONS

Chang et al., "Normalization Process Technique of a Small Composite Wind Turbine Blades", Department of Mechanical Engineering, China University of Science Technology, pp. 1-159, vol. 47, Apr. 2011.

Office Action issued in connection with corresponding CN Application No. 201480010019.2 on Dec. 28, 2015.

HYBRID TURBINE BLADE INCLUDING MULTIPLE INSERT SECTIONS

BACKGROUND

This disclosure relates generally to turbomachines, and more particularly to both gas turbines and steam turbines, and the design of turbine blade composed of inserts made from different materials.

Steam turbines include, but are not limited to, steam turbine power generation equipment and shipboard steam turbine propulsion equipment. An exemplary steam turbine typically contains a high-pressure turbine section, a low-pressure turbine section, or a combination of both, which is rotated by the steam flow. Gas turbines include, but are not limited to, gas turbine power generation equipment and gas turbine aircraft engines. An exemplary gas turbine typically includes a core engine, having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) connected by a smaller diameter coaxial shaft to drive the front fan (located forward of the high pressure compressor) and to drive an optional low pressure compressor (located between the front fan and the high pressure compressor). The low-pressure compressor sometimes is called a booster compressor or simply a booster.

In the exemplary steam turbine, typically the high and low pressure turbine sections have steam turbine blades each including an airfoil portion attached to a shank portion. In the exemplary gas turbine, typically the fan and the high and low pressure compressors and turbines have gas turbine blades each including an airfoil portion attached to a shank portion. Rotor blades are gas or steam turbine blades attached to a rotating gas or steam turbine rotor discs, respectively. Stator vanes are gas turbine blades or steam turbine blades attached to a non-rotating gas or steam turbine stator casings, respectively. Typically, there are alternating circumferential rows of radially-outwardly extending rotor blades and radially-inwardly extending stator vanes. When present in the gas turbine configuration, a first and/or last row of stator vanes (also called inlet and outlet guide vanes) may have their radially-inward ends also attached to a non-rotating gas turbine stator casing. Counter rotating "stator" vanes are also known in gas turbine designs. Conventional gas and steam turbine blade designs typically have airfoil portions that are made entirely of metal, such as titanium, or are made entirely of a composite. The all-metal blades, including costly wide-chord hollow blades, are heavier in weight, resulting in lower fuel performance and requiring sturdier blade attachments.

In a gas turbine aircraft application, the lighter all-composite blades, without a metal leading edge, are more susceptible to damage from bird ingestion events. Known hybrid blades include a composite blade whose leading edge is protected by metal (with the rest of the blade covered by a non-metallic coating) for erosion and bird impact reasons. The gas turbine fan blades typically are the largest (and therefore the heaviest) blades in a gas turbine aircraft engine and the front fan blades are the first to be impacted by a bird strike. Composite blades have typically been used in applications where weight is a major concern. However, the desire for reduced collateral damage during blade loss events in addition to higher operating speeds has created the desire to reduce the weight of these blades even further.

Prior attempts to overcome this problem have utilized composite sandwich airfoil construction including an airfoil portion comprised of a single composite low density insert core sandwiched between carbon/epoxy face sheets. While resulting in a lightweight design, stress states resulting from these single lightweight insert structures has shown to be problematic under bird strike conditions due to geometric stress concentration and modulus mismatch. More particularly, use of a single insert proved to produce inter-laminar stresses in excess of the composite material capability under static bird strike testing. Subsequent optimization of the single insert shape and size suggested that a solution was unobtainable.

Accordingly, there is a need for an improved turbine blade specifically, what is needed is a gas turbine blade, and especially a gas turbine fan blade, that is lighter in weight than either traditional composite or hybrid blade and including reduced geometric stress concentrations. What is also needed is a steam turbine blade that is lighter than either traditional composite or hybrid blades.

BRIEF SUMMARY

These and other shortcomings of the prior art are addressed by the present disclosure, which provides a hybrid turbine blade.

In accordance with an embodiment, provided is a hybrid turbine blade including a shank portion; and an airfoil portion including an outer composite structure and having a recess formed therein, the airfoil portion comprising: at least one composite section having a first density; at least two insert sections each having a second mass density which is less than said first mass density, the at least two insert sections disposed in alternating stacked relationship with the at least one composite section and defining an alternating stack of the at least one composite section and the at least two insert sections, wherein the alternating stack of the at least one composite section and the at least two insert sections is disposed in the recess and extending chordwise, spanwise and through a substantial thickness of the airfoil portion, wherein an outermost layer of the at least two insert sections is bonded to the outer composite structure, and wherein said outer composite structure, said at least one composite section and said at least two insert sections together define an airfoil shape.

In accordance with another embodiment, provided is a hybrid turbine blade including a shank portion; and an airfoil portion comprising a composite outer structure having a first mass density and a recess and at least one composite section having a first density, and at least two insert sections each having a second mass density which is less than said first mass density, the at least two insert sections disposed in alternating stacked relationship with the at least one composite section and defining an alternating stack of the at least one composite section and the at least two insert sections, wherein said alternating stack of the at least one composite section and the at least two insert sections is disposed in said recess and extending chordwise, spanwise and through a substantial thickness of the airfoil portion, wherein said composite outer structure and said alternating stack of the at least one composite section and the at least two insert sections together define an airfoil shape, wherein said alternating stack of the at least one composite section and the at least two insert sections has sufficient stiffness and dimensional stability to maintain said airfoil shape and has sufficient compliance and flexibility to conform to said recess, wherein said composite outer structure and said at least one composite section are comprised of a plurality of composite material layers comprising fiber filaments embedded in a matrix binder, and wherein said at least two insert sections are comprised of a material selected from the group consisting of thermoplastic materials, thermoset materials, metals, honeycomb ceramics, silicones and combinations thereof.

In accordance with yet another embodiment, provided is a method of fabricating a hybrid turbine blade including laying up a plurality of composite material layers to form a portion of a composite outer structure, said portion of said composite outer structure comprising a recess; and disposing an alternating stack of at least one composite section and at least two insert sections in said recess, extending chordwise, spanwise and through a substantial thickness of the hybrid turbine blade.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Figure 1:
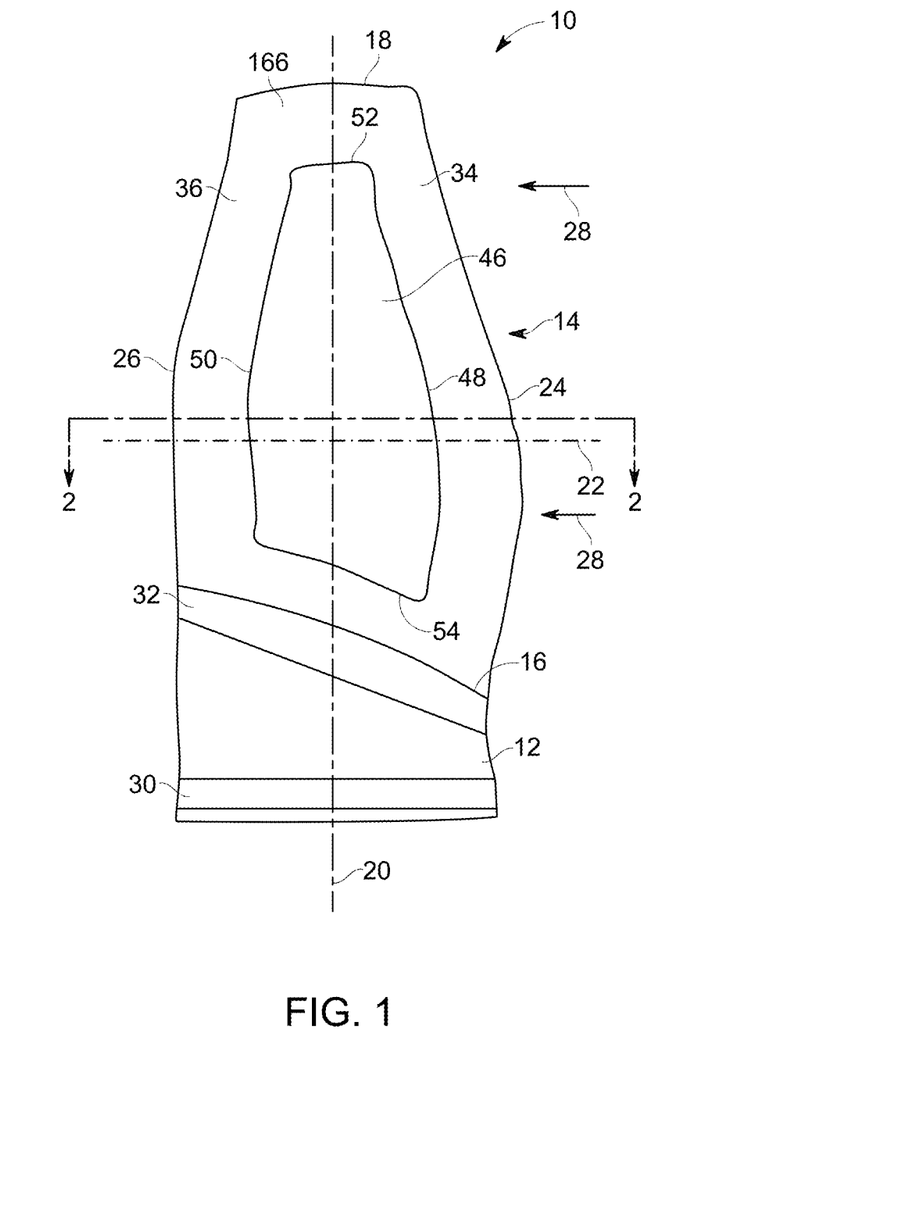
FIG. 1 is a schematic side-elevational view of a pressure side of a hybrid turbine blade constructed according to an aspect of the present disclosure.

Referring now to FIG. 1, illustrated is a hybrid turbine blade 10, in accordance with one embodiment of the present disclosure. The hybrid turbine blade 10 includes a shank portion 12 and an airfoil portion 14 as depicted. The airfoil portion 14 has a design operating temperature, a blade root 16 attached to the shank portion 12, a blade tip 18, a radial, or major, axis 20 extending outward toward the blade tip 18 and inward toward the blade root 16 and a tangential, or minor, axis 22 extending from a leading edge 24 to a trailing edge 26. As used herein, "radial axis" 20 and "tangential axis" 22 refer to reference axes and not a physical part of hybrid turbine blade 10. In a gas turbine application the design operating temperature is the maximum temperature the airfoil portion 14 is expected to experience during normal operation of the gas turbine (not shown). An example of a typical gas turbine and a typical steam turbine design operating temperature is, without limitation, between generally 18 degrees Centigrade and generally several-hundred degrees Centigrade. Medium direction arrows 28 in FIG. 1 generally indicate the medium direction. The medium typically comprises air in a gas turbine application and typically comprises saturated steam or superheated steam in a steam turbine application.

In a gas turbine application of the hybrid turbine blade 10, the shank portion 12 typically includes a dovetail 30, for attachment of the hybrid turbine blade 10 to a rotor disc (not shown), and a blade platform 32, for helping to radially contain the air flow. As previously indicated, the airfoil portion 14 defines the leading edge 24 and the trailing edge 26, wherein the medium direction 28 is generally from the leading edge 24 to the trailing edge 26. The airfoil portion 14 also has a pressure side 34 and a suction side 36, where the distance from the leading edge 24 to the trailing edge 26 across the suction side 36 is typically longer than the distance from the leading edge 24 to the trailing edge 26 across the pressure side 34. In a gas turbine compressor application the hybrid turbine blade 10 typically rotates in a direction such that the pressure side 34 passes a reference point before the suction side 36 passes the same reference point. In a steam turbine application the hybrid turbine blade 10 typically rotates in a direction such that the suction side 36 passes a reference point before the pressure side 34 passes the same reference point.

Figure 2:
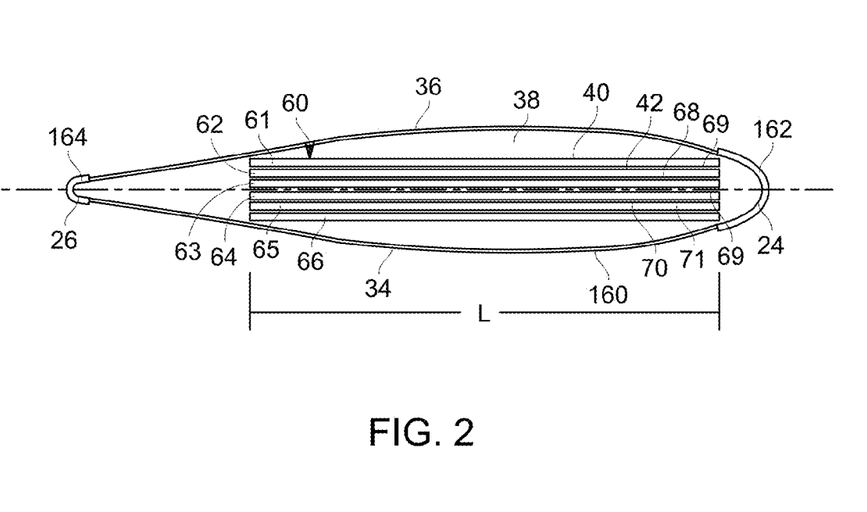
FIG. 2 is schematic cross-sectional view of the airfoil portion of an embodiment of the hybrid turbine blade of FIG. 1, taken along lines 2-2 of FIG. 1.
Figure 4:
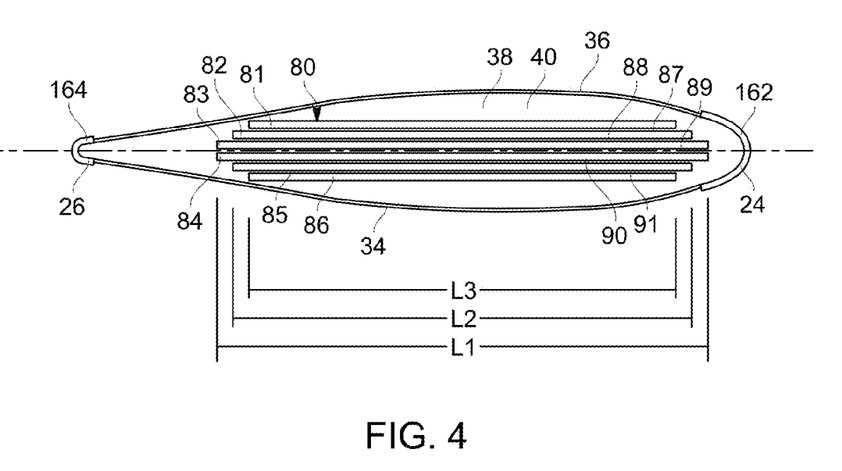
FIG. 4 is schematic cross-sectional view of the airfoil portion of another embodiment of the hybrid turbine blade of FIG. 1, taken along lines 2-2 of FIG. 1.
Figure 6:
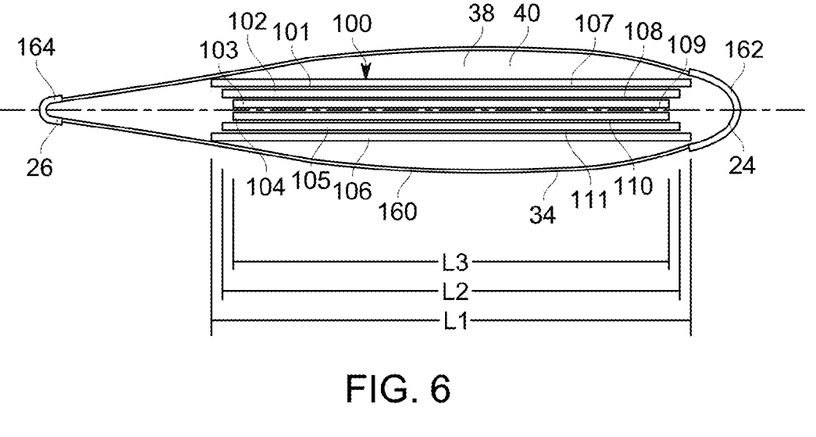
FIG. 6 is schematic cross-sectional view of the airfoil portion of yet another embodiment of the hybrid turbine blade of FIG. 1, taken along lines 2-2 of FIG. 1.

The airfoil portion 14 also includes an outer composite structure 38 as depicted in FIGS. 2, 4 and 6. As used herein, "composite structure" is defined as one or more layers comprising a composite material. The term "composite material" is defined to be a material having any (metal or non-metal) fiber filament embedded in any (metal or non-metal) matrix binder. In one embodiment of the present disclosure, the outer composite structure 38 is a lay-up of discrete composite laminations. The composite material is comprised of fiber filaments embedded in a matrix binder. In an exemplary embodiment, the composite material is comprised of graphite fiber filaments embedded in an epoxy (i.e. epoxy resin) matrix binder. Other choices for the fiber filaments in the composite material include, but are not limited to, glass fibers, aramid fibers, carbon fibers, and boron fibers and combinations thereof. Other choices for the matrix resin include, but are not limited to, bismaleimide, polyimide, polyetherimide, polyetheretherketone, poly(aryl sulfone), polyethersulfone and cyante ester and combinations thereof. In one embodiment the matrix binder includes toughening materials such as rubber particles. The outer composite structure 38 has a first mass density and radially extends from generally the blade root 16 to generally the blade tip 18. The first mass density of the outer composite structure 38 typically is in a range from about 1.4 grams per cubic centimeter to about 2.0 grams per cubic centimeter.

In an embodiment, the outer composite structure 38 extends spanwise along the entire leading edge 24 and the entire trailing edge 26 between the blade platform 32 and the blade tip 18. The outer composite structure 38 extends chordwise between the leading and trailing edges 24 and 26. In an exemplary construction, the outer composite structure 38 has no surface through-holes and no recesses other than a recess 40 formed therein. Recess 40 has disposed therein at least one composite section 42 having a first density and at least two insert sections 44 having a second mass density which is less than said first mass density. The at least at least two insert sections 44 are disposed in alternating stacked relationship with the at least one composite section 42 to form a stack 46 comprised of a laminated sandwich structure. The stack 46 formed of the alternating at least one composite section 42 and the at least two insert sections 44 extends chordwise and through a substantial thickness of the airfoil portion 14 from the pressure side 34 to the suction side 36, as illustrated in FIGS. 2, 4, and 6. An outermost layer of each of the at least two insert sections 44 wherein is bonded to the outer composite structure 38. The outer composite structure 38, the at least one composite section 42 and the at least two insert sections 44 together define an airfoil shape wherein the at least one composite section 42 and the at least two insert sections 44 are fully enclosed by the outer composite structure 38.

In an embodiment, the overall thickness of the hybrid turbine blade 10 is predetermined (in general), whereby some portion of a composite volume defining the airfoil portion 14 is converted into the discrete insert sections, and more specifically, the at least two insert sections 44. In an embodiment, the complete stack 46 is comprised of the at least two insert sections 44 and the at least one composite section 42, wherein each of the at least two insert sections 44 are of the same order of magnitude in thickness as the at least one composite section 42. This is in contrast to traditional sandwich composite structures typically consisting of one large insert through the thickness of the airfoil portion. In the illustrated embodiments, such as in FIG. 3, each of the at least one composite sections 67-71 is comprised of a plurality of plies and has substantially the same overall thickness as each of the at least two insert sections 61-66. These insert and composite sections 42, 44 may in general be of any thickness and are not to be confused with a single composite ply from which the hybrid turbine blade 10 may be manufactured. In an alternate embodiment, the hybrid turbine blade 10, and more particularly the at least one composite section 42 is not made from one or more ply composites (prepreg), but instead comprised of a dry fiber preform and a resin that is injected utilizing a resin injection transfer technique. In this instance, a thickness of each of the at least two insert sections 44 is on the order of 10 to 100 fiber diameters. In an embodiment, a maximum thickness of each of the at least two insert sections 44 is approximately 0.25".

In a gas turbine application, the stack 46, formed of the alternating at least one composite section 42 and the at least two insert sections 44, is located in the hybrid turbine blade 10 such that neither the bird strike resistance nor the frequency response of the hybrid turbine blade 10 is sacrificed. The alternating at least one composite section 42 and the at least two insert sections 44 are incorporated into the standard lay-up and curing process of the hybrid turbine blade 10 and require no special tooling apart from that required to fabricate. More particularly, in one embodiment, the at least two insert sections 44 are wrapped in an epoxy film adhesive and placed into an airfoil laminate structure during the ply layup, including the material forming at least one composite section 42 and the outer composite structure 38, during the composite layup. The film adhesive and the composite laminate material are co-cured in a single operation. It may be desired that the at least two insert sections 44 are conformable to the airfoil shape prior to curing of the materials. Alternatively, the at least two insert sections 44 may be pre-formed to the desired shape and placed into the composite laminate material during cure.

In one embodiment of the present disclosure, at least two insert sections 44 have a second mass density that is lower than the first mass density of the outer composite structure 28 and the at least one composite section 42. In one embodiment of the present disclosure, the at least two insert sections 44 are comprised of an elastomeric material, a foam, a rubber, or other composite material that is both lighter and desirably more resilient than the surrounding composite material forming the at least one composite section 42 and the outer composite structure 38. In one alternative embodiment, the at least two insert sections 44 are comprised of a base thermoplastic elastomer and lightweight filler particles. The lightweight filler particles are generally identically sized, wherein the lightweight filler particles comprise a plurality of air-containing cavities. Each cavity in each lightweight filler particle typically has a volume of about $10^{-16}$ cubic-millimeters. As used herein, the term "lightweight" is defined to be material having a density in a typical range from about 0.001 grams/$cm^3$ to about 1.2 grams/$cm^3$. In one embodiment of the present disclosure, the lightweight filler particles are comprised of polymer particles, where each polymer particle typically comprises the air containing cavity and each polymer particle has a cellular structure (regardless of size, shape, uniformity, or content). These lightweight filler particles are generally uniformly dispersed throughout the base elastomer in the at least two insert sections 44. In one embodiment, the lightweight elastomer material in at least two insert sections 44 is fabricated by introducing lightweight filler particles into the base elastomer prior to curing. The resulting density of the elastomer material in the at least two insert sections 44 is lower than that of the fiber-reinforced outer composite structure 38 and at least one composite section 42.

In an embodiment of the present disclosure, the at least two insert sections 44 are placed into the composite laminate, comprised of the at least one composite section 42 and the outer composite structure 38, formed of unidirectional or woven composite facesheets and interstitial sheets. Additional composite layers are disposed, covering the at least two insert sections 44, to produce a completed version of the outer composite structure 38.

In one embodiment of the present disclosure, the resulting second mass density of the at least two insert sections 44 produced by the present disclosure is generally in a typical range from about 0.01 grams per cubic centimeter to about 0.9 grams per cubic centimeter. The second mass density of the at least two insert sections 44 is lower than the first mass density of the outer composite structure 28 and the at least one composite section 42. The at least two insert sections 44 further define, in combination with the at least one composite section 42 the previously described stack 46 having a stack leading edge 48, a stack trailing edge 50, a stack blade tip edge 52 (FIG. 1), and a stack blade root edge 54 (FIG. 1).

The high elongation capability and low elastic modulus of the elastomer material in the at least two insert sections 44 allows mechanical loads to be efficiently transferred around the at least two insert sections 44 rather than through the at least two insert sections 44. In one embodiment, the elastomer material in the at least two insert sections 44 has an elongation capability of at least about 20% and has an elastic modulus range from about 3500 kPa to about 350000 kPa. In an embodiment, the at least two insert sections 44 have an elongation at break greater than 30%. The elastic modulus and elongation capability of the insert section material is selected, such that the insert section material has a low deformation during the processing of the at least two insert sections 44, and more particularly the ply up of the stack 46, and the strength to withstand cracking during fabrication. In addition the insert section material is selected, such that the insert section material is capable of withstanding low cycle and high cycle fatigue. Low cycle fatigue is typically represented by about 30,000 startup and shutdown cycles, while the high cycle fatigue is typically represented by greater than 1,000,000 rotational cycles.

In one embodiment of the present disclosure, the at least two insert sections 44 are formed such that they have sufficient stiffness and dimensional stability to maintain the airfoil shape during fabrication of the outer composite structure 38. In one embodiment of the present disclosure, the at least two insert sections 44 are formed so as to retain sufficient compliance and flexibility, so that the at least two insert sections 44 conform to the recess 40 defined by the outer composite structure 38. The artisan chooses the number of insert sections and termination of the ends (described presently) of each of the at least two insert sections 44.

The at least two insert sections 44 are bonded to the at least one composite section 42 sandwiched therebetween and the outer composite structure 38. Bonding to the composite structures 38 is accomplished by adhesion between the material of an outermost insert section of the at least two insert sections 44 and the outer composite structure 38 material. Other examples of bonding include, without limitation, autoclave cycle curing, adhesive bonding, and fusion bonding (adhesive film or paste). In an embodiment, the outer composite structure 38 has a first volume and in combination, the at least two insert sections 44 and the at least one composite section 42 disposed therebetween have a second volume. In an embodiment, the second volume is equal to at least generally ten percent of a first volume of the outer composite structure 38. The outer composite structure 38 and the stack 46, comprised of the at least two insert sections 44 and the at least one composite section 42, (which in one embodiment comprises four or more insert sections, as shown in FIGS. 2-7) together typically define an airfoil shape.

Referring more specifically to FIGS. 2-7, as illustrated, the low density at least two insert sections 44 are clustered about the mid-plane of the airfoil thickness where the in-plane bending loads are lowest. At this location, the at least two insert sections 44 act to reduce the weight of the airfoil portion 14, thereby increasing efficiency and/or performance capability of the system utilizing the blade 10. The composite material serves to take substantially all of the structural loading and maintain the overall shape of the airfoil portion 14 during operation.

Figure 3:
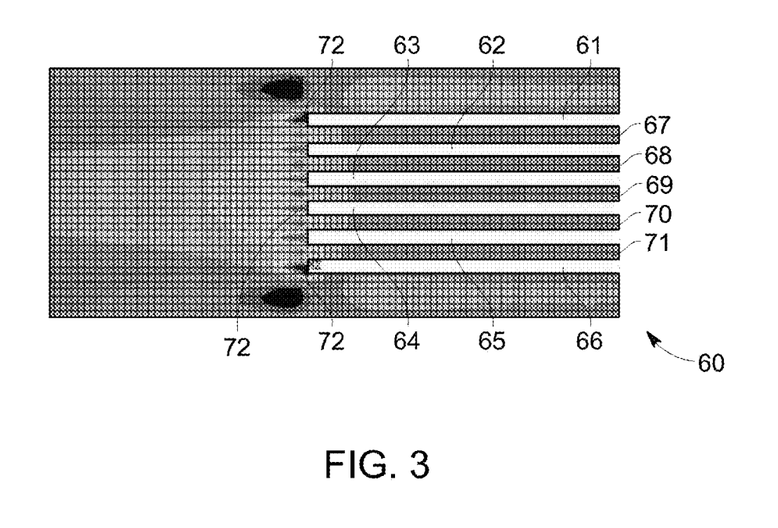
FIG. 3 illustrates a transverse shear stress analysis of the embodiment of FIG. 2 constructed in accordance with an aspect of the present disclosure wherein optimization of the airfoil portion is achieved through the configuration of the insert termination.

As previously indicated, the distribution, thickness and pattern in which the ends of the at least two insert sections 44 and the at least one composite section 42 terminate, proximate the leading edge 24 and the trailing edge 26 of the airfoil portion 14, are design specific. More specifically, the termination may be tailored by the designer to minimize stress concentration and maximize weight savings. Referring more specifically to FIGS. 2-7, illustrated are optimization examples, wherein the stack 46 comprised of the at least one composite section 42 and the at least two insert sections 44 are designed having differing termination ends, according to embodiment described herein. More specifically, illustrated in FIGS. 2 and 3 is a stack 60, generally similar to stack 46 of FIG. 1, including the at least one composite section 42 and the at least two insert sections 44. In this particular embodiment, the stack 60 is comprised of six insert sections 61-66, having disposed and sandwiched therebetween five composite sections 67-71. As illustrated, the six insert sections 61-66 and the five composite sections 67-71 terminate at the leading edge 24 and the trailing edge 26 at generally the same point. More particularly, the six insert sections 61-66 and the five composite sections 67-71 extend chordwise an equal length "L" between the leading edge 24 and the trailing edge 26. FIG. 3 illustrates a transverse shear stress analysis of the embodiment of FIG. 2, wherein illustrated are regions of stress concentration 72 under bending resulting from the six insert sections 61-66.

Figure 5:
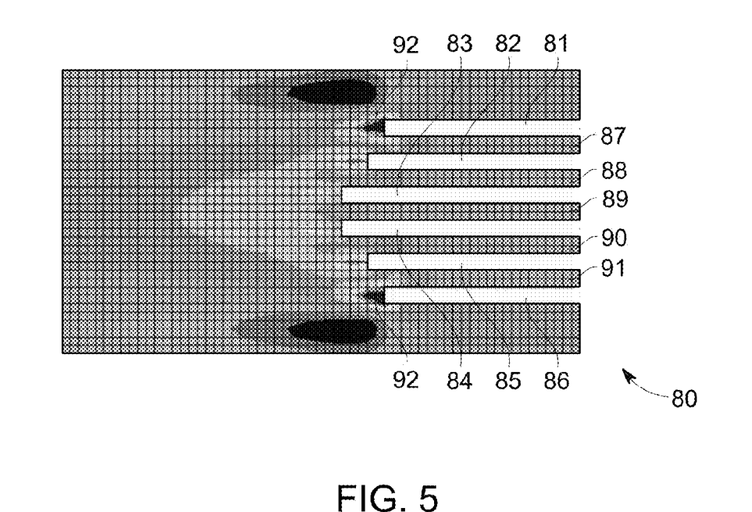
FIG. 5 illustrates a transverse shear stress analysis of the embodiment of FIG. 4 constructed in accordance with an aspect of the present disclosure wherein optimization of the airfoil portion is achieved through the configuration of the insert termination.

Referring now to FIGS. 4 and 5, illustrated is a stack 80, generally similar to stack 46 of FIG. 1, including the at least one composite section 42 and the at least two insert sections 44. In this particular embodiment, the stack 80 is comprised of six insert sections 81-86, having disposed and sandwiched therebetween five composite sections 87-91. As illustrated, the six insert sections 81-86 and the five composite sections 87-91 terminate at the leading edge 24 and the trailing edge 26 at differing points. More particularly, insert sections 83 and 84 extend a chordwise distance "L1" between the leading edge 24 and the trailing edge 26. The insert sections 82 and 85 extend a chordwise distance "L2" between leading edge 24 and the trailing edge 26 that is less than that of the insert sections 83 and 84. The insert sections 81 and 86 extend a chordwise distance "L3" between leading edge 24 and the trailing edge 26 that is less than that of the insert sections 82 and 85. FIG. 5 illustrates a transverse shear stress analysis of the embodiment of FIG. 4, having varying insert section lengths. More particularly, FIG. 5 illustrates a transverse shear stress analysis, wherein illustrated are regions of stress concentration 92 under bending resulting from the six insert sections 81-86. Providing the six insert sections 81-86 that terminate at different locations allows for reduction in shear stress depending on the loading (bending loads).

Figure 7:
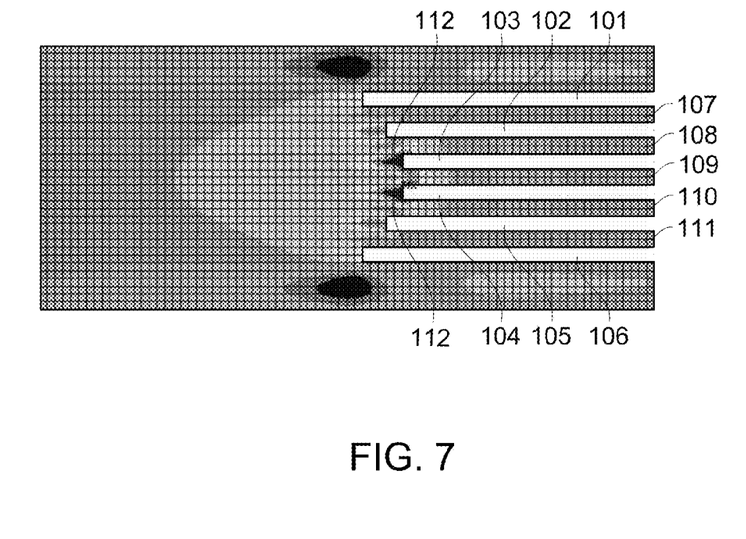
FIG. 7 illustrates a transverse shear stress analysis of the embodiment of FIG. 6 constructed in accordance with an aspect of the present disclosure wherein optimization of the airfoil portion is achieved through the configuration of the insert termination.

Referring now to FIGS. 6 and 7, illustrated is a stack 100, generally similar to stack 46 of FIG. 1, including the at least one composite section 42 and the at least two insert sections 44. Similar to the embodiment described with regard to FIGS. 2-5, the stack 100 is comprised of six insert sections 101-106, having disposed and sandwiched therebetween five composite sections 107-111. As illustrated, the six insert sections 101-106 and the five composite sections 107-111 terminate at the leading edge 24 and the trailing edge 26 at differing points. More particularly, insert sections 101 and 106 extend a chordwise distance "L1" between the leading edge 24 and the trailing edge 26. The insert sections 102 and 105 extend a chordwise distance "L2" between leading edge 24 and the trailing edge 26 that is less than that of the insert sections 101 and 106. The insert sections 103 and 104 extend a chordwise distance "L3" between leading edge 24 and the trailing edge 26 that is less than that of the insert sections 102 and 105. FIG. 7 illustrates a transverse shear stress analysis of the embodiment of FIG. 6, having varying insert section lengths. More particularly, FIG. 7 illustrates a transverse shear stress analysis, wherein illustrated are regions of stress concentration 112 under bending resulting from the six insert sections 101-106. Providing the six insert sections 101-106 that terminate at different locations allows for reduction in shear stress depending on the loading (bending loads).

Figure 8:
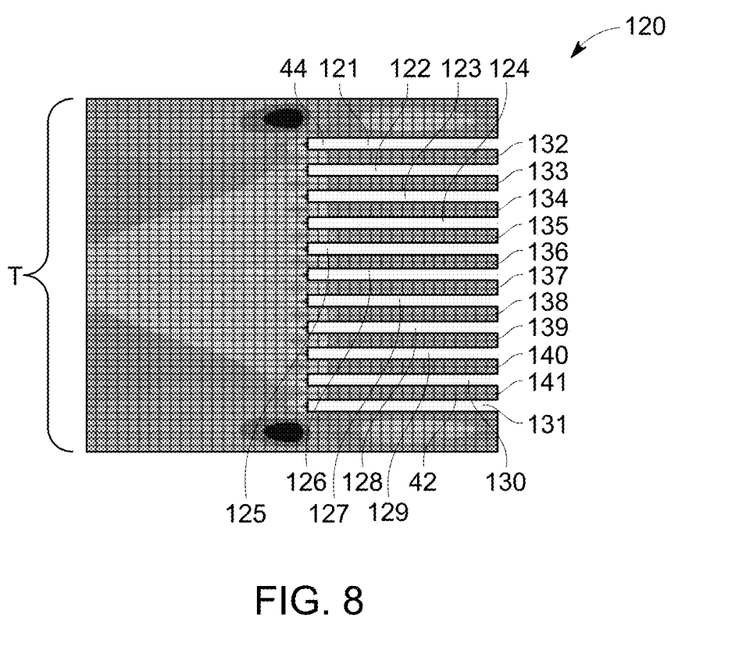
FIG. 8 illustrates a transverse shear stress analysis of a hybrid turbine blade constructed in accordance with an aspect of the present disclosure wherein optimization of the airfoil portion is achieved through the insert count.
Figure 9:
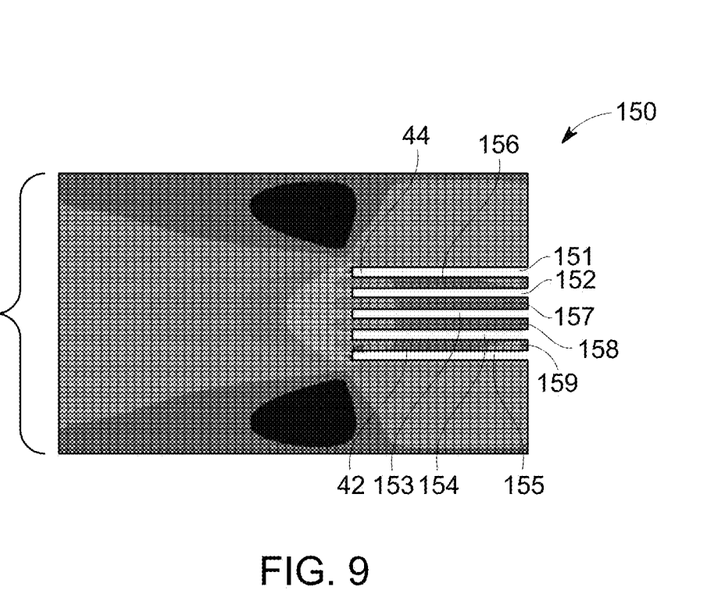
FIG. 9 illustrates a transverse shear stress analysis of another embodiment of a hybrid turbine blade constructed in accordance with an aspect of the present disclosure wherein optimization of the airfoil portion is achieved through the insert count.

As previously indicated, the thickness of the stack 46 (60, 80, 100) is determined by the number of insert sections and composite sections, as well as the thickness of each section, and is design specific. More specifically, the stack 46 (60, 80, 100) may be tailored by the designer to minimize stress concentration and maximize weight savings. Referring now to FIGS. 8 and 9, illustrated are optimization examples, wherein the stack 46 of the at least one composite section 42 and the at least two the at least one composite section 42 are designed having differing stack configurations, according to embodiments described herein. More specifically, illustrated in FIG. 8 is a stack 120, generally similar to stack 46 of FIG. 1, including the at least one composite section 42 and the at least two insert sections 44. In this particular embodiment, the stack 120 is comprised of eleven insert sections 121-131, having disposed and sandwiched therebetween ten composite sections 132-141. As illustrated, the eleven insert sections 121-131 and the ten composite sections 132-141 determine the overall thickness of the stack 120. FIG. 8 illustrates a transverse shear stress analysis of an embodiment including the eleven insert sections 121-131, having disposed and sandwiched therebetween ten composite sections 132-141, wherein the number of discrete inserts has been increased through the thickness "T" of the airfoil portion 14 at the expense of reduced individual insert thickness for the purpose of stress reduction (load dependent).

Referring more specifically to FIG. 9, illustrated is a stack 150, generally similar to stack 46 of FIG. 1, including the at least one composite section 42 and the at least two insert sections 44. In this particular embodiment, the stack 150 is comprised of five insert sections 151-155, having disposed and sandwiched therebetween four composite sections 156-159. As illustrated, the five insert sections 151-155 and the four composite sections 156-159 determine the overall thickness of the stack 150. FIG. 9 illustrates a transverse shear stress analysis of an embodiment including the five insert sections 151-155, having disposed and sandwiched therebetween the four composite sections 156-159, wherein the number of discrete inserts has been reduced through the thickness "T" of the airfoil portion 14 at the expense of increased individual insert thickness for the purpose of stress reduction (load dependent). In an embodiment, the insert volume of the five insert sections 151-155 would be greater than 5% or less than 50% of the total blade volume.

In some embodiments of the present disclosure, the airfoil portion 14 of FIG. 1 includes an erosion coating 160 as shown in FIGS. 2, 4 and 6. In one embodiment of the present disclosure, the erosion coating 160 of FIG. 2 is disposed on at least a portion of the pressure side 34 and the erosion coating 160 is disposed on at least a portion of the suction side 36. In another embodiment of the present disclosure, the erosion coating 160 of FIG. 4 is disposed on and bonded to at least a portion of the pressure side 34 and the erosion coating 160 is disposed on and bonded to at least a portion of the suction side 36. In one embodiment, polyurethane was selected as the material for the erosion coating 160, as the polyurethane provides greater erosion resistance than the outer composite structure 38.

In another embodiment of the present disclosure, a protective leading edge coating 162 is disposed on the leading edge 24, at least a portion of the pressure side 34, and at least a portion of the suction side 36. In an exemplary embodiment, titanium was selected as a material for the protective leading edge coating 162, as titanium provides greater erosion resistance than the outer composite structure 38. When titanium is used as the protective leading edge coating 162, the titanium provides a high strength to weight ratio. When utilizing titanium as the protective leading edge coating 162, the titanium also provides increased ruggedness compared to the outer composite structure 38 with respect to foreign object ingestion or bird strike events that are likely to be experienced in aircraft engine fan blades. Example configurations for the inclusion of the erosion coating, protective leading edge coating 162, protective trailing edge coating 164 and protective blade tip edge coating 166 on the airfoil 14 are described in commonly assigned, U.S. Pat. No. 6,607,358, S Finn et al., "Multi-Component Hybrid Turbine Blade", which is incorporated by reference herein in its entirety.

Referring again to FIG. 1, the shank portion 12 is typically a composite shank portion suitably bonded or otherwise affixed to the airfoil portion 14. However, a metal shank portion (suitably bonded or otherwise affixed to the composite airfoil portion) may be employed in particular blade designs. The dovetail 22 of the shank portion 12 can be partially composite (not shown) on the pressure (concave) side. Alternatively, the dovetail 22 can have a metal wedge system (also not shown) to positively capture adjoining the insert section and provide a metallic dovetail wear surface.

In a gas turbine application of the present disclosure, the bird impact footprint is primarily over the area of the pressure side 34 along the leading edge 24 of the hybrid turbine blade 10. In one embodiment of the present disclosure, the affected areas of the outer composite structure 38, the stack 46, comprised of the alternating at least one composite section 42 and the at least two insert sections 44, and the protective leading edge coating 132 provide buckling and fracture resistance. In one embodiment of the present disclosure, the reduced mass of the hybrid turbine blade 10, compared to a similarly configured non-hybrid turbine blade, has the general effect of reducing the broken blade impact force on the containment structure and trailing blades (not shown) for a given blade rotational speed.

In another gas turbine application of the present disclosure, the stack 46, comprised of the alternating at least one composite section 42 and the at least two insert sections 44, is mechanically or thermally removable from the outer composite structure 38 at a temperature below the melting point of the composite material. This allows the airfoil portion 14 to be easily repairable should it become damaged due to bird strikes or foreign object impacts. If the airfoil portion is damaged in the outer composite structure 38 and the damaged stack 46, comprised of the alternating at least one composite section 42 and the at least two insert sections 44, would be thermally removed, the outer composite structure 38 repaired, and a new alternating at least one composite section 42 and at least two insert sections 44 re-inserted. Since most of such blade damage is to the lead row of hybrid turbine blades 10, typically the airfoil portion 14 is an airfoil portion of a hybrid turbine blade 10 in a gas turbine aircraft engine (or gas turbine aircraft engine compressor if the gas turbine engine has no fan).

The at least two insert sections 44 function to facilitate lay-up and autoclave curing or other manufacturing methods of the hybrid turbine blade 10. As previously described, in one embodiment, the at least one composite section 42 is disposed between at least two insert sections 44, to form the stack 46 comprised of a laminated sandwich structure. The at least one composite section 42 provides additional stability to the at least two insert sections 44 during fabrication. Forming the laminated sandwich structure typically lowers the initiation of cracks within the at least two insert sections 44 and allows more efficient load transfer around the recess 40 in the final application. In an embodiment, a layer of adhesive coats the at least two insert sections 44. The layer of adhesive may also be used to improve the bond between the outer composite structure 38 and the at least two insert sections 44 by improving adhesion between the at least two insert sections 44 and the outer composite structure 38. The hybrid turbine blade 10 in its fully assembled condition has the stack 46 comprised of a laminated sandwich structure, and more particularly the alternating at least one composite section 42 and the at least two insert sections 44 disposed in the recess 40 of the outer composite structure 38, so that the surrounding composite material layers in the outer composite structure 38 are capable of meeting all mechanical requirements, whereby no load transfer needs to occur through the insert section 38. When an elastomeric material is utilized to construct the at least two insert sections 44, the high compliance and elongation capabilities of the elastomer material allow the outer composite structure 38 to deform with little resistance from the at least two insert sections 44 even in a severe impact loading, such as might occur when a gas turbine engine ingests a foreign object.

A typical method for making the hybrid turbine blade 10 of the disclosure includes, but is not limited to, fabricating the outer composite structure 38 and the stack 46 comprised of a laminated sandwich structure separately or as one unit (co-cured) using autoclave and compression mold techniques. In one fabrication method of the present disclosure the stack 46 comprised of a laminated sandwich structure is prefabricated. A plurality of composite material layers are laid up to generate a portion of the outer composite structure 38, where the portion of the outer composite structure 38 comprises the recess 40. The at least two insert sections 44 are disposed in the recess 40 and additional composite material layers that comprised the at least one composite section 42 are laid up, so that the additional composite material layers that are disposed therebetween and cover the at least two insert sections 44 and the final desired thickness of the outer composite structure 38 is reached and a completed version of the outer composite structure 38 is produced. The completed version of the outer composite structure 38 is then subjected to a process that consolidates and bonds the composite materials together and the process also bonds the at least two insert sections 44 to the adjacent composite materials that form the at least one composite section 41 and the outer composite structure 38. The consolidation and bonding process is typically performed by an autoclave technique, alternatively the compression mold technique, and alternatively the resin mold technique. The autoclave technique, compression mold technique, and resin mold technique are only provided as examples of the consolidation and bonding process and do not imply a restriction to the present disclosure.

In one embodiment of the present disclosure, the stack 46, comprised of the laminated sandwich structure, is typically built up by manual or machine layering. As previously mentioned, in the case of composite materials, fiber-filament modulus and orientation would be chosen to maintain overall airfoil-portion stiffness to reduce structural bending of the blade under centrifugal and aerodynamic load, as is within the level of skill of the artisan.

The foregoing description of several embodiments of the present disclosure has been presented for purposes of illustration. Although the disclosure has been described and illustrated in detail, it is to be clearly understood that the same is intended by way of illustration and example only and is not to be taken by way of limitation. Obviously many modifications and variations of the present disclosure are possible in light of the above teaching. Accordingly, the spirit and scope of the present disclosure are to be limited only by the terms of the appended claims.

What is claimed is:

1. A hybrid turbine blade comprising:
a shank portion; and
an airfoil portion including an outer composite structure and having a recess formed therein, the airfoil portion comprising:
at least one composite section having a first density;
at least two insert sections each having a second mass density which is less than said first mass density, the at least two insert sections disposed in alternating laminate stacked relationship with the at least one composite section and defining an alternating laminate stack of the at least one composite section and the at least two insert sections,
wherein the alternating laminate stack of the at least one composite section and the at least two insert sections is disposed in the recess and having a major axis extending along a span of the airfoil portion, a minor axis extending along a chord of the airfoil portion and a thickness extending perpendicular to the major axis and through a thickness of the airfoil portion,
wherein an outermost layer of the at least two insert sections is bonded to the outer composite structure, and
wherein said outer composite structure, said alternating laminate stack of the at least one composite section and said at least two insert sections together define an airfoil shape.

2. The hybrid turbine blade of claim 1, wherein said at least two insert sections have a stiffness and dimensional stability to maintain said airfoil shape, and wherein said at least two insert sections retain compliance and flexibility to conform to said recess.

3. The hybrid turbine blade of claim 1, wherein said at least one composite section is comprised of a plurality of composite material layers comprising fiber filaments embedded in a matrix binder.

4. The hybrid turbine blade of claim 3, wherein said at least one composite section is comprised of graphite fibers embedded in an epoxy resin matrix binder.

5. The hybrid turbine blade of claim 1 wherein:
said airfoil portion has a design operating temperature and further comprises a blade root attached to said shank portion, a blade tip, and a radial axis extending outward toward said blade tip and inward toward said blade root, and wherein said alternating laminate stack of the at least one composite section and the at least two insert sections substantially extends from said blade root to said blade tip.

6. The hybrid turbine blade of claim 5, wherein said at least two insert sections maintain dimensional stability at said design operating temperature.

7. The hybrid turbine blade of claim 1 further comprising an erosion coating disposed on and bonded to at least a portion of a pressure side and at least a portion of a suction side of said outer composite structure.

8. The hybrid turbine blade of claim 1, wherein said first mass density has a range from 1.4 grams per cubic centimeter to 2.0 grams per cubic centimeter.

9. The hybrid turbine blade of claim 1, wherein said second mass density has a range from 0.01 grams per cubic centimeter to 0.9 grams per cubic centimeter.

10. The hybrid turbine blade of claim 1, wherein said composite outer structure has a first volume and said alternating laminate stack of the at least one composite section and the at least two insert sections has a second volume, and wherein said second volume has a value corresponding to at least ten percent of said first volume.

11. The hybrid turbine blade of claim 1, wherein a thickness of the at least one composite section is on an order of magnitude of a thickness of each of said at least two insert sections.

12. The hybrid turbine blade of claim 1, wherein an insert termination of each the at least two insert sections is configured to provide airfoil portion optimization.

13. A hybrid turbine blade comprising:
   a shank portion; and
   an airfoil portion comprising a composite outer structure having a first mass density and a recess and at least one composite section having a first density, and at least two insert sections each having a second mass density which is less than said first mass density, the at least two insert sections disposed in alternating laminate stacked relationship with the at least one composite section and defining an alternating laminate stack of the at least one composite section and the at least two insert sections,
   wherein said alternating laminate stack of the at least one composite section and the at least two insert sections is disposed in said recess and having a major axis extending along a span of the airfoil portion, a minor axis extending along a chord of the airfoil portion and a thickness extending perpendicular to the major axis and through a thickness of the airfoil portion,
   wherein said composite outer structure and said alternating laminate stack of the at least one composite section and the at least two insert sections together define an airfoil shape, wherein said alternating laminate stack of the at least one composite section and the at least two insert sections has a stiffness and dimensional stability to maintain said airfoil shape and retain compliance and flexibility to conform to said recess,
   wherein said composite outer structure and said at least one composite section are comprised of a plurality of composite material layers comprising fiber filaments embedded in a matrix binder, and
   wherein said at least two insert sections are comprised of a material selected from the group consisting of thermoplastic materials, thermoset materials, metals, honeycomb ceramics, silicones and combinations thereof.

14. The hybrid turbine blade of claim 13, wherein said first mass density has a range from 1.4 grams per cubic centimeter to 2.0 grams per cubic centimeter.

15. The hybrid turbine blade of claim 13, wherein said second mass density has a range from 0.01 grams per cubic centimeter to 0.9 grams per cubic centimeter.

16. A method of fabricating a hybrid turbine blade comprising:
   laying up a plurality of composite material layers to form a portion of a composite outer structure, said portion of said composite outer structure comprising a recess; and
   disposing an alternating laminate stack of at least one composite section and at least two insert sections in said recess, the laminate stack having a major axis extending along a span of the hybrid turbine blade, a minor axis extending along a chord of the hybrid turbine blade and a thickness extending perpendicular to the major axis and through a substantial thickness of the hybrid turbine blade.

17. The method of claim 16, further comprising:
   laying up additional composite sections and additional insert sections so as achieve a final desired thickness of the alternating laminate stack of at least one composite section and at least two insert sections and form a completed version of said alternating laminate stack of at least one composite section and at least two insert sections; and
   consolidating and bonding said completed version of said alternating laminate stack of at least one composite section and at least two insert sections and said composite outer structure.

18. The method of claim 17, wherein said consolidating and bonding of said completed version of said alternating laminate stack of at least one composite section and at least two insert sections and said composite outer structure comprises using at least one of an autoclave technique, a compression mold technique, and a resin mold technique.

19. The method of claim 17, wherein said completed version of said alternating laminate stack of at least one composite section and at least two insert sections meets all mechanical load carrying requirements of said hybrid turbine blade such that no load transfer needs to occur through said at least two insert sections.

20. The method of claim 16, further comprising the step of pre-fabricating said alternating laminate stack of at least one composite section and at least two insert sections prior to disposing said alternating laminate stack in said recess.

\* \* \* \* \*